(12) United States Patent
Schmidt

(10) Patent No.: US 7,290,897 B2
(45) Date of Patent: Nov. 6, 2007

(54) HANDS-FREE FISHING LURE ILLUMINATION APPARATUS

(76) Inventor: Randy Schmidt, 16830 Washington St., Ham Lake, MN (US) 55304

( * ) Notice: Subject to any disclaimer, the term of this patent is extended or adjusted under 35 U.S.C. 154(b) by 231 days.

(21) Appl. No.: 11/135,228

(22) Filed: May 23, 2005

(65) Prior Publication Data
US 2006/0262548 A1    Nov. 23, 2006

(51) Int. Cl.
*F21V 33/00* (2006.01)
(52) U.S. Cl. ...................................... 362/190; 353/119
(58) Field of Classification Search ................ 353/119; 362/640, 190
See application file for complete search history.

(56) References Cited

U.S. PATENT DOCUMENTS

| | | | | |
|---|---|---|---|---|
| 5,388,039 A | * | 2/1995 | Dolph | ........................ 362/154 |
| 5,987,802 A | * | 11/1999 | Caprio | ........................ 43/17.5 |
| 6,684,557 B1 | * | 2/2004 | Yu | ............................... 43/17.6 |
| 2003/0151922 A1 | * | 8/2003 | Peng et al. | ................. 362/372 |
| 2003/0221357 A1 | * | 12/2003 | Parsons | ........................ 43/4.5 |

* cited by examiner

*Primary Examiner*—Laura Tso
(74) *Attorney, Agent, or Firm*—Haugen Law Firm PLLP

(57) ABSTRACT

An illumination apparatus includes a base having a bottom surface and a mounting portion that is operably disposed above the bottom surface by between about one and one hundred centimeters, and a lamp device having a housing and a lamp, and being secured to the mounting portion in an orientation enabling radiant energy to be emitted from the lamp device in a predetermined direction. The lamp device further includes an actuation mechanism disposed at one or more of the housing and the base, such that the lamp may be selectively energized and de-energized by a user through a hands-free operation.

9 Claims, 4 Drawing Sheets

HANDS-FREE FISHING LURE ILLUMINATION APPARATUS

FIELD OF THE INVENTION

The present invention relates to illumination devices generally, and more particularly to an illumination device that is specifically configured for hands-free activation to selectively illuminate a suspended object, such as a luminescent fishing lure.

BACKGROUND OF THE INVENTION

Illumination devices of various designs have long been utilized in a wide range of applications. With the advent of portable electrical power supply units in the form of compact batteries, portable illumination devices have become extremely popular. Such portable illumination devices may come in the form of, for example, flashlights, lanterns, and other compact configurations containing a light source. As one would expect, applications for such portable illumination devices are vast.

A particular application for portable light sources is in the illumination of luminescent fishing lures. Such fishing lures utilize luminescent material on an outer surface thereof so as to "glow" when submerged into the water. Such an effect is particularly useful in applications where natural light is impeded or blocked from entering the body of water, or in nighttime fishing. Luminescent fishing lures are often times used in ice fishing applications wherein natural light is shielded from the water by snow and ice formed at the top surface. The luminescent material on such fishing lures, however, only temporarily retains enough energy to visibly glow, and to thereby attract fish to the lure. As a result, fishermen are required to repeatedly withdraw their luminescent lure from the body of water so as to re-energize the luminescent material by applying relatively intense radiant energy thereto.

Typically, the application of radiant energy to a luminescent fishing lure is performed by manually grasping the fishing lure in one hand, and directing light from, for example, a portable flashlight onto the fishing lure by manually grasping the e.g. flashlight in the other hand. The fisherman must usually also manually rotate the luminescent lure in the field of illumination in order to "charge" the entire luminescent surface of the lure. This process requires significant time and effort. In addition, ambient temperatures in ice fishing applications typically cause discomfort to the fisherman in having to manipulate the fishing lure and the illumination device with their bare hands.

It is therefore a principal object of the present invention to provide a portable illumination device that enables selective illumination of, for example, a luminescent fishing lure in a hands-free operation.

It is another object of the present invention to provide a hands-free illumination device that is able to charge a luminescent fishing lure in a relatively short period of time.

It is a still further object of the present invention to provide a hands-free portable illumination device that is readily adaptable to conventional instrumentation commonly possessed by fishermen.

SUMMARY OF THE INVENTION

By means of the present invention, a portable illumination device is provided for operation in a hands-free manner. The illumination apparatus is particularly adapted to enable the hands-free illumination of, for example, luminescent fishing lures to thereby charge the lure with luminescent energy without the need to manually manipulate either of the lure or the illumination means.

In a particular embodiment, the illumination apparatus of the present invention includes a base having a bottom surface and a mounting portion that is operably disposed above the bottom surface by between about one and one hundred centimeters. The illumination apparatus further includes a lamp device having a housing and a lamp of at least about 15 watts, with the lamp device being secured to the mounting portion of the base in an orientation enabling radiant energy to be emitted from the lamp device in a predetermined direction. The lamp device preferably further includes an actuation means disposed at one or more of the housing and the base, such that the lamp may be selectively energized and de-energized by the user through a hands-free operation.

In a further aspect of the present invention, a method for illuminating a suspended object includes providing an illumination apparatus having a base with a mounting portion, and a lamp device having a housing and a lamp of at least about 15 watts, with the lamp device being secured to the mounting portion in an orientation enabling radiant energy to be emitted from the lamp device in a predetermined direction. The lamp device preferably further includes an actuation mechanism disposed at one or more of the housing and the base. The method further provides placing the illumination apparatus on a surface such that the lamp device selectively emits radiant energy within an illumination zone that is between about one and one hundred centimeters above the surface. A suspended object is preferably then suspended in the illumination zone and the actuation means triggered through a hands-free operation to thereby illuminate the suspended object.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
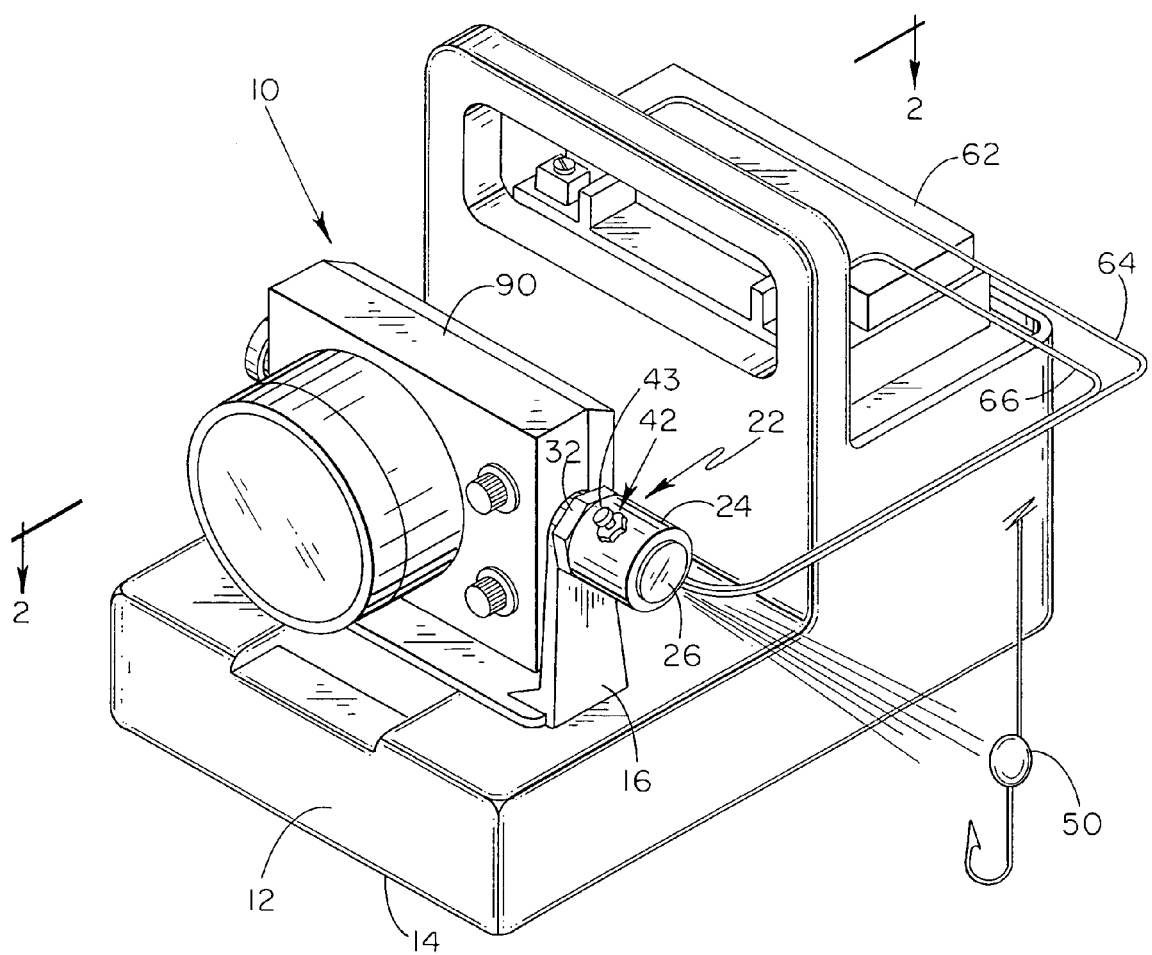
FIG. 1 is a perspective view of an illumination apparatus of the present invention.

With reference now to the drawing figures, and first to FIG. 1, an illumination apparatus 10 includes a base 12 having a bottom surface 14 and a mounting portion 16 disposed therewith. Illumination apparatus 10, as illustrated in FIG. 1, is shown as a specific embodiment contemplated by the present invention. Namely, base 12 is illustrated substantially as a commercially available depth sounder and sonar unit mounting apparatus available from Vexilar, Inc. of Minneapolis, Minn. under the trade name FL-18 and FL-8SE Genz Packs. It is to be understood, however, that base 12 illustrated in FIG. 1 is merely exemplary of a variety of configurations for a base to which lamp device 22 may be operably secured.

Lamp device 22 is preferably secured to mounting portion 16 of base 12 at a position of between about 1 and about 100 cm above bottom surface 14 of base 12. In applications wherein lamp device 22 is utilized to illuminate a luminescent fishing lure 50, it is desired that lamp device 22 be positioned at a relatively low height relative to bottom surface 14 of base 12 such that luminescent lure 50 need not be elevated to a large extent above the fishing medium. For example, a user of illumination apparatus 10 in an ice fishing application preferably places base 12 upon the ice adjacent to a hole in the ice through which the user drops the fishing line and luminescent lure 50 into the water. Since typical luminescent lures only temporarily radiate luminescent energy therefrom, "re-charging" of the lure is periodically required. In order to do so, the user of the present invention is merely required to elevate luminescent lure 50 out from the water to a height necessary to position luminescent lure 50 within an illumination zone defined by the radiant energy being operably emitted by lamp device 22. Accordingly, by operably positioning lamp device 22 at a relatively low orientation with respect to the ice surface, the user need only raise luminescent lure 50 out from the water by a small distance.

As best shown in FIGS. 1 and 4A-4D, lamp device 22 preferably includes a housing 24 and a lamp 26 disposed therein. Lamp 26 is preferably adhesively or otherwise fixedly or removably secured at least partially within an axial chamber of housing 24 in such a manner so as to axially transmit radiant energy therefrom. Housing 24 is preferably fabricated from a durable and corrosion-resistant material, such as an aluminum metal or a polymeric material. A particularly preferred example material for use in the manufacture of housing 24 of lamp device 22 is aluminum, though other polymeric and non-polymeric materials may also or instead be utilized in the manufacture of housing 24.

Housing 24 is preferably relatively compact in size so as to be readily adaptable with conventional mounting systems commonly utilized in the fishing industry. In one example, housing 24 is approximately 8 cm in length and 6 cm in diameter, though many other sizes and configurations for housing 24 are contemplated by the present invention. Preferably, lamp device 22 is removably securable to mounting portion 16 of base 12. An example mechanism for such removable securement of lamp device 22 to mounting portion 16 is illustrated in FIGS. 3 and 4B-4D, wherein a threaded rod 30 extends from a rear surface 28 of housing 24. Threaded rod 30 preferably threadably engages with a threaded receptacle 17 in mounting portion 16 of base 12 for selectively engaging and disengaging lamp device 22 to and from mounting portion 16.

In a particular embodiment of the present invention, threaded rod 30 of lamp device 22 is configured to threadably engage within threaded receptacle 17 and within a threaded receptacle (not shown) of a depth sounder device 90. Most portable depth sounder devices utilized in the fishing industry are similarly configured, with one or more threaded receptacles being positioned in a side portion thereof for operably mounting said transducer devices to base units, such as that illustrated in FIG. 1. Accordingly, lamp device 22 of the present invention is preferably configured to not only be removably securable to base 12, but to also act as a fixation device for operably securing depth sounder 90 to mounting portion 16 of base 12.

Various manufacturers of such depth sounder devices, however, utilize distinct threaded receptacle sizes and/or thread pitches. To accommodate such variability, threaded rod 30 of the present invention is preferably removably secured to housing 24, such that a selected threaded rod 30 configured for threadable engagement with a particular depth sounder device 90 may be selectively secured to housing 24. The selective securement of various threaded rods 30 to housing 24 is preferably accomplished by providing a threaded aperture in housing 24 having first size and thread pitch dimensions, and a series of threaded rods 30 having a first portion of the first size and thread pitch dimensions, and a second portion having size and thread pitch dimensions corresponding to the size and thread pitch dimensions of the threaded receptacles in the particular depth sounder device 90. Through such a configuration, lamp device 22 is intended to be readily adaptable to conventional depth sounder mounting systems without significant modification thereto.

Lamp 26 is preferably mounted within a chamber of housing 24, such that radiant energy emits substantially axially out from housing 24. Such an arrangement leads to intuitive placement of lamp device 22 by the user in order to efficiently illuminate luminescent lure 50. In addition, housing 24 may preferably include a grasping portion 32 that includes a texture to facilitate the rotational installation and removal of lamp device 22 with respect to threaded receptacle 17 of mounting portion 16. In the embodiment illustrated in the drawings, grasping portion 32 includes an octagonally-configured portion of the outer surface 29 of housing 24, through other configurations for grasping portion 32 are contemplated by the present invention including, for example, a knurled outer surface of housing 24.

Lamp 26 preferably comprises a radiant energy source of relatively high intensity so that luminescent fishing lure 50 may be operably charged in a short period of time. Preferably, luminescent fishing lure 50 may be fully charged within about 3-7 seconds of exposure to radiant energy emitted by lamp 26. As such, lamp 26 has a power output of at least about 15 watts, and more preferably at least about 20 watts. In a particular embodiment, lamp 26 is a 20 watt halogen bulb available from Feit Electric Company of Pico Riviera, Calif. Applicant has determined that this and similar halogen bulbs are most desired for the intensity of radiant energy generated, thereby limiting the time required to fully energize or charge luminescent fishing lure 50.

An important feature of the present invention is in the provision of actuation device 42 being operably coupled to lamp 26. Actuation device 42 is preferably a switch that alternately opens and closes an electrical circuit coupled to lamp 26 to thereby selectively energize an de-energize lamp 26. Actuation device 42 may preferably be disposed at housing 24 of lamp device 22, but may also or instead be positioned at base 12 of apparatus 10. Actuation device 42 is preferably configured to be readily actuated through a hands-free operation, such as by the user's foot. To do so, actuation device 42 may be, for example, a push-type switch that alternately opens and closes the respective electrical circuit to lamp 26. Other actuation devices, however, may be implemented in apparatus 10 of the present invention, so long as such actuation devices may be actuated without manipulation by one or more of the user's hands.

In some embodiments of the present invention, cap 88 may be provided for selectively covering actuation device 42. Cap 88 is preferably fabricated from a relatively rigid material so as to prevent inadvertent depression of button 43 of actuation device 42 when cap 88 is in place over actuation device 42.

Figure 2:
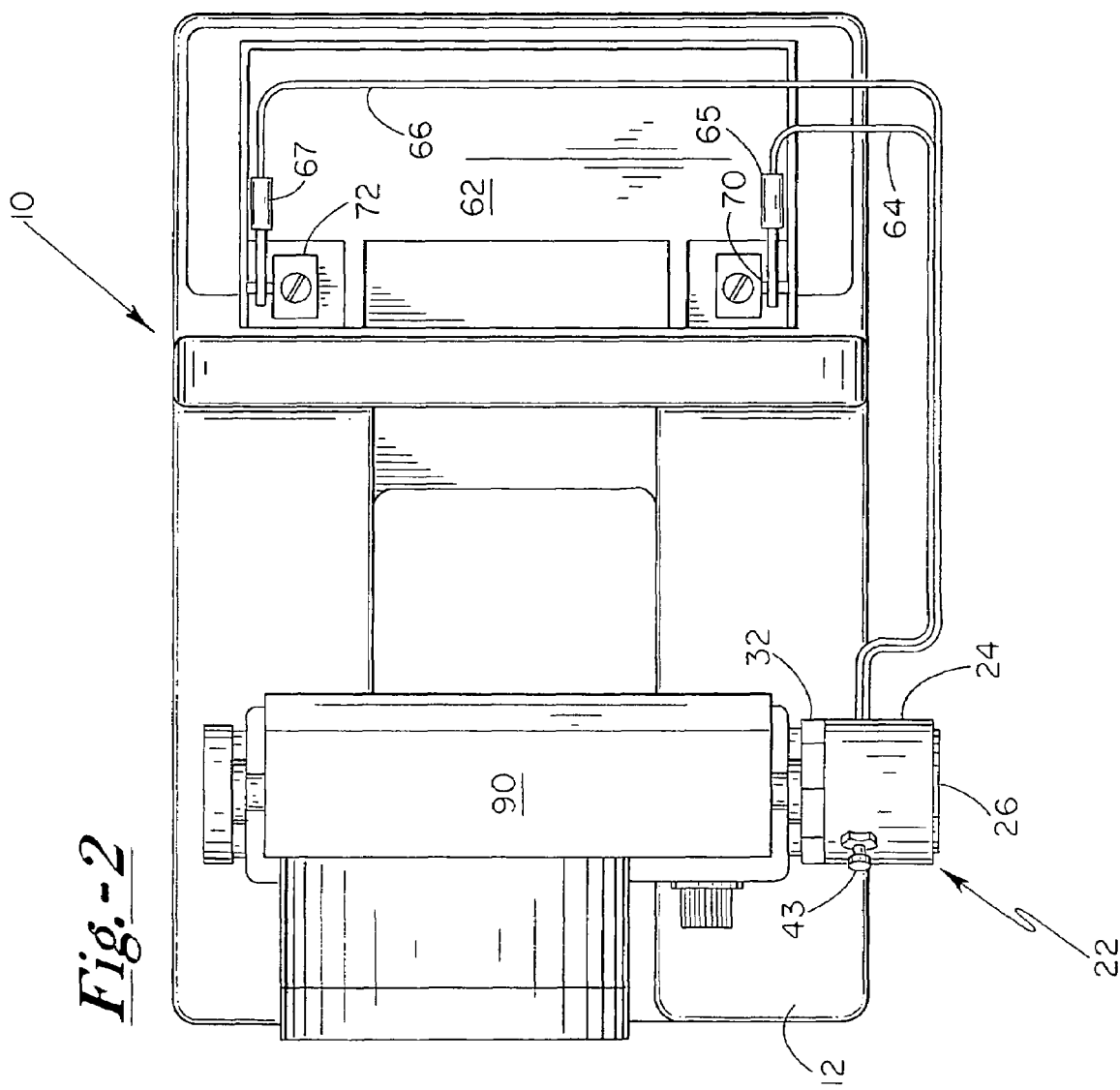
FIG. 2 is a top view of the illumination apparatus illustrated in FIG. 1.
Figure 3:
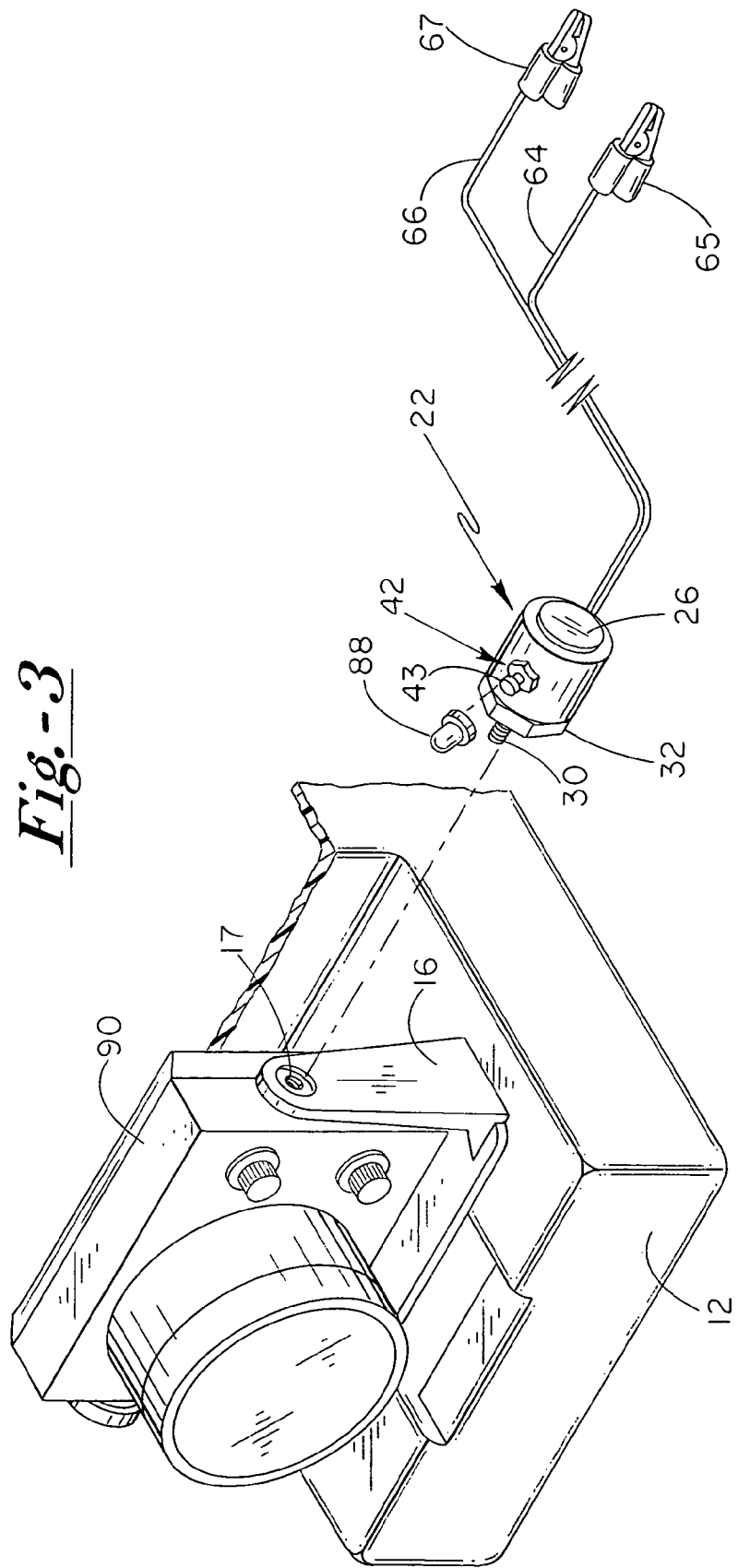
FIG. 3 is a is a partially exploded view of the illumination apparatus illustrated in FIGS. 1 and 2.
Figure 4A:
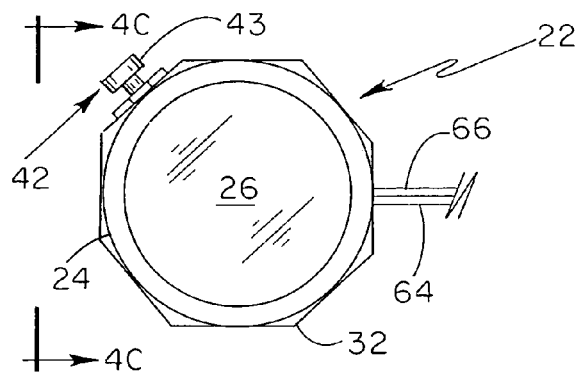
FIG. 4A is a front view of portion of the illumination apparatus illustrated in FIGS. 1-3.
Figure 4B:
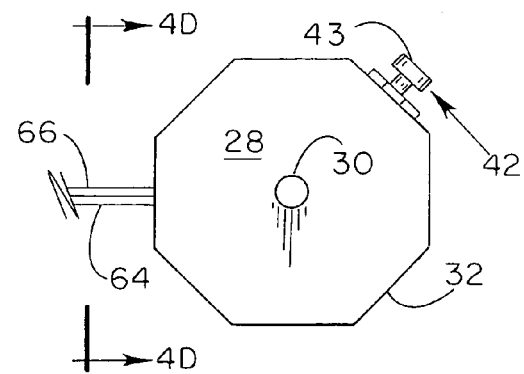
FIG. 4B is a rear view of the portion of the illumination apparatus illustrated in FIG. 4A.
Figure 4C:
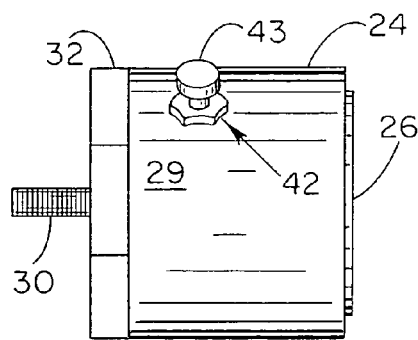
FIG. 4C is a first side view of the portion of the illumination apparatus illustrated in FIGS. 4A and 4B.
Figure 4D:
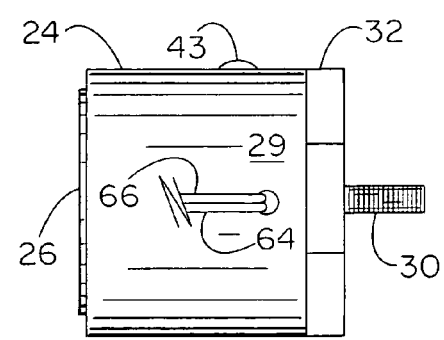
FIG. 4D is a second side view of the portion of the illumination apparatus illustrated in FIGS. 4A, 4B, and 4C.

As shown in FIGS. 1-3, lamp device 22 is preferably operably coupled to a portable electrical power source, such as battery 62. In embodiments wherein battery 62 is a free-standing battery external to lamp device 22, electrical lead wires 64, 66 preferably extend from lamp device 22 to respective terminals 70, 72 of battery 62. In preferred embodiments, conventional "alligator clips" 65, 67 are coupled to respective terminal ends of lead wires 64, 66 so as to operably engage with respective terminals 70, 72 of battery 62.

It has been determined by the applicant that battery 62 is preferably a 12-volt battery so as to provide for extended and consistent use of lamp 26 of the present invention. Other battery sizes, including batteries positionable within housing 24 are also contemplated by the present invention as providing a portable electrical energy source for lamp 26. In addition, other electrical energy sources may additionally or instead be utilized with lamp of the present invention. For example, lamp 26 may be configured for adaptation with any conventional direct current and/or alternating current outlets. Examples of such outlets include automotive power outlets, generator outlets, extension cords, and the like. Accordingly, the particular source of electrical energy for lamp 26 should not be construed as limiting to apparatus 10 of the present invention.

As described above, illumination apparatus 10 is particularly configured for the operable illumination of a luminescent fishing lure that is suspended by fishing line 52 from a fishing rod (not shown). To do so, illumination apparatus 10 is preferably placed on a surface, such as the surface of ice on a lake, so that lamp device 22 may selectively emit radiant energy within an illumination zone that is between about 1 and 100 centimeters above the surface. The user then operably reels in the fishing line or otherwise elevates luminescent lure 50 to thereby suspend lure 50 in the illumination zone. Actuation device 42 is then actuated by the user in a hands-free operation, such as by depressing button 43 with a foot.

A further aspect and advantage of the present invention is in the automatic nature of illuminating, and thereby charging, the entire luminescent surface of lure 50 without manual manipulation thereof. Specifically, fishing line tends to have a latent spiral nature, which is exacerbated by being typically wound upon a spool of a conventional fishing reel. Such spirality of the fishing line tends to result in a spinning operation of a lure that is attached to the fishing line, particularly when little resistance to such spinning about an axis defined by the fishing line is present. Such a phenomenon often times takes place when the lure is suspended above the water surface, such that little resistance is offered by the air to the latent rebound forces in the fishing line causing the lure to spin about an axis defined by such fishing line. This spinning action tends to automatically rotate luminescent lure 50 while being suspended in the illumination zone of apparatus 10. As such, an entire outer surface of luminescent lure 50 is operably exposed to radiant energy emitted by lamp 26, which therefore results in the operable charging of the entire activatable surface of luminescent lure 50.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A method for illuminating a suspended object, the method comprising the steps of:
   (a) providing an illumination apparatus including:
      (i) a base having a mounting portion; and
      (ii) a lamp device having a housing and a lamp of at least about 15 watts, and being secured to said mounting portion in an orientation enabling radiant energy to be emitted from said lamp device in a predetermined direction, said lamp device further including an actuation means disposed at one or more of said housing and said base;
   (b) placing said illumination apparatus on a surface such that said lamp device selectively emits radiant energy within an illumination zone that is between about 1 and 100 cm above said surface;
   (c) suspending said suspended object in said illumination zone; and
   (d) triggering said actuation means through a hands-free operation.

2. A method as in claim 1 wherein said mounting portion is an upstanding arm extending from said base.

3. A method as in claim 1 wherein said lamp device is removably secured to said base.

4. A method as in claim 1 wherein said lamp is a halogen bulb.

5. A method as in claim 1 wherein said lamp device is operably coupled to a 12-volt battery.

6. A method as in claim 1 wherein said surface is a ground surface.

7. A method as in claim 1 wherein said suspended object is a luminescent fishing lure.

8. A method as in claim 7 wherein said luminescent fishing lure is suspended by a fishing line from a fishing rod.

9. A method as in claim 1 wherein said lamp device is secured to said mounting portion and an orientation appropriate for emitting radiant energy in a substantially horizontal direction.

\* \* \* \* \*